April 27, 1943.　　　　R. LEPPLA　　　　2,317,389
CAR TRUCK
Filed March 3, 1941　　　3 Sheets-Sheet 1
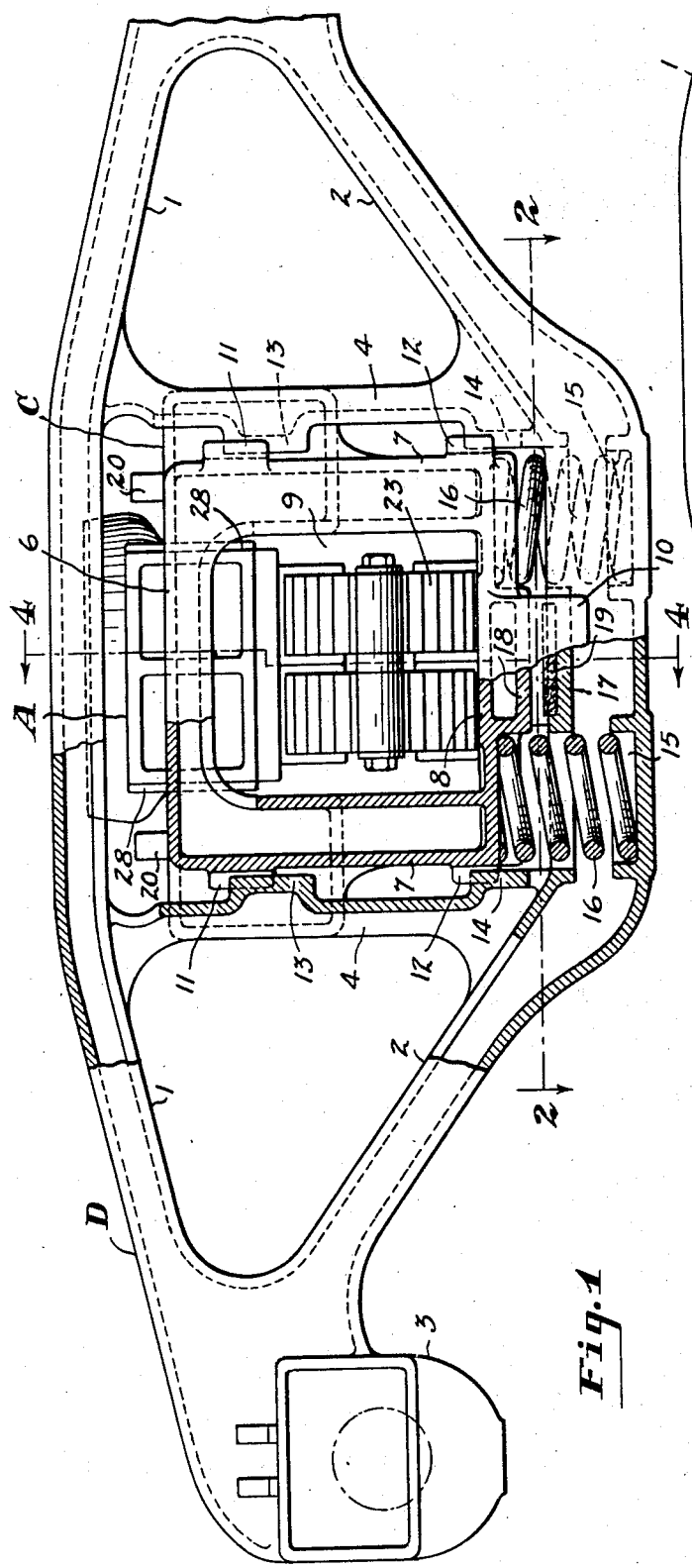
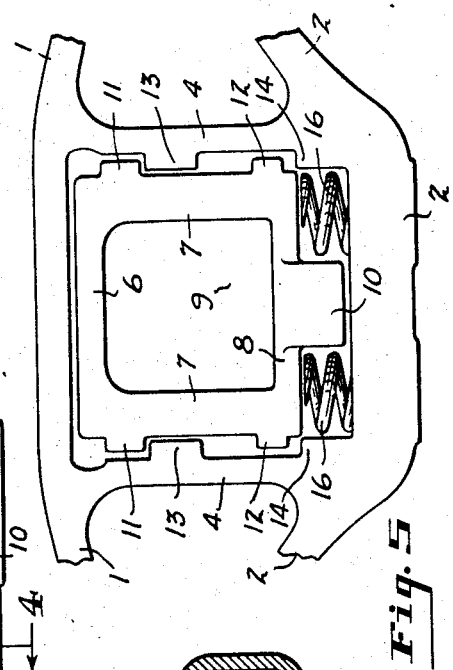
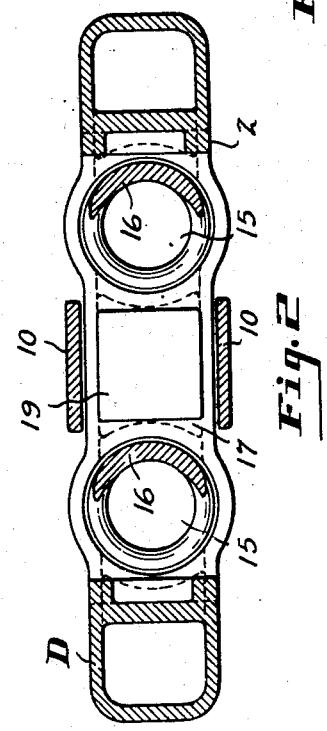
INVENTOR
*Rudolph Leppla*
BY *Evans + McCoy*
ATTORNEYS

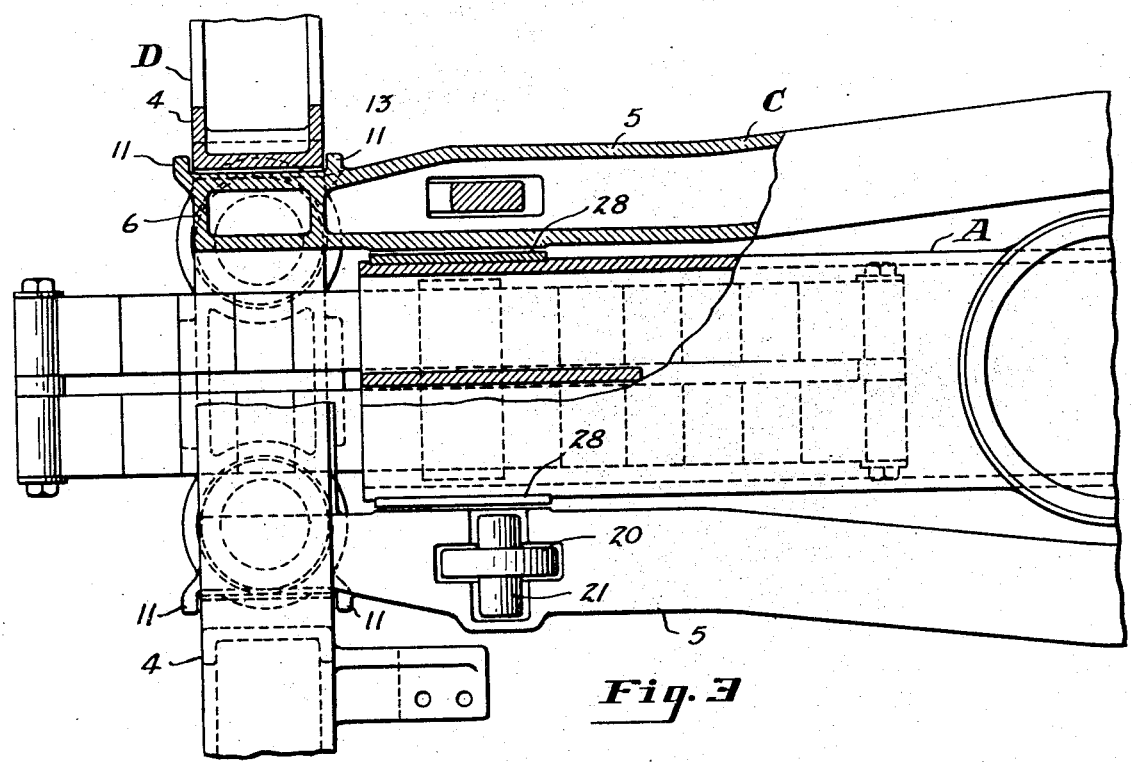
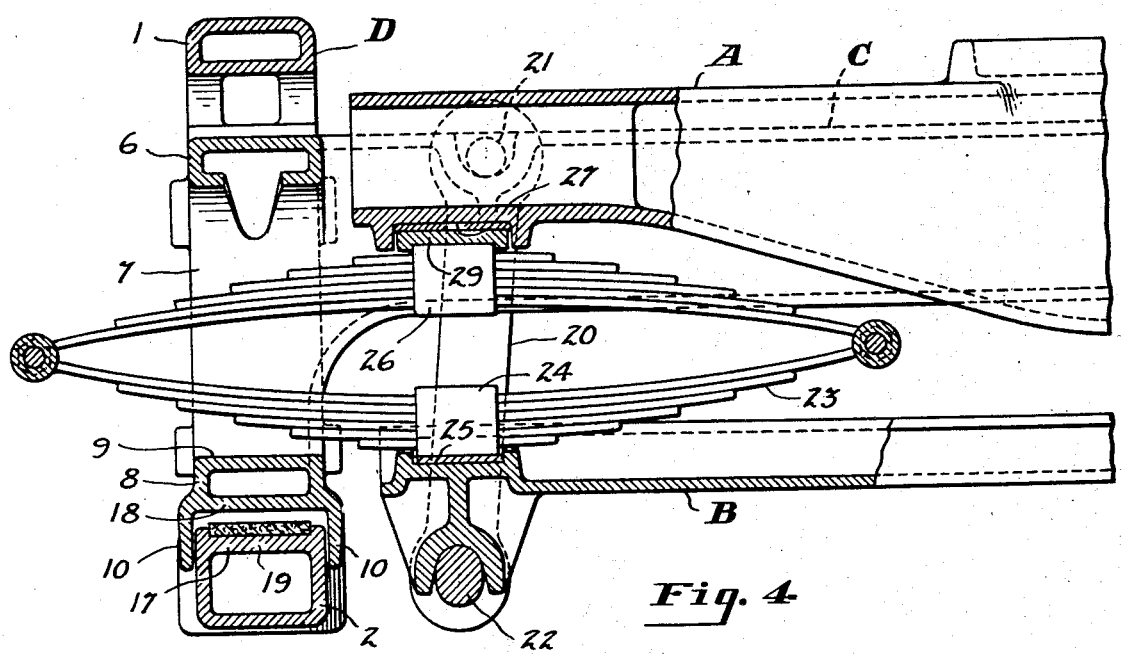

April 27, 1943.  R. LEPPLA  2,317,389
CAR TRUCK
Filed March 3, 1941  3 Sheets-Sheet 3
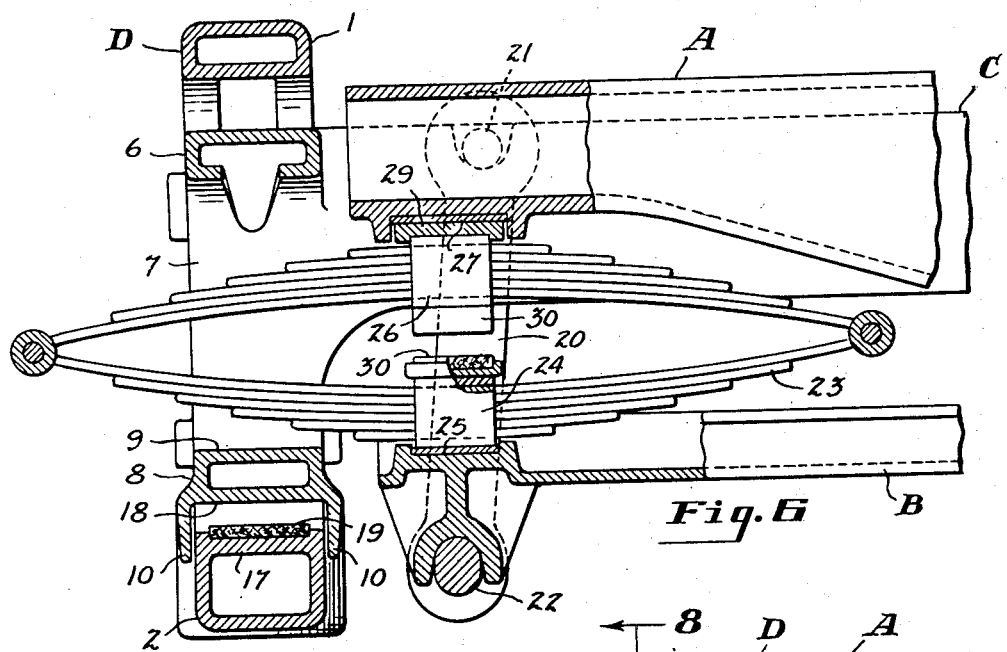
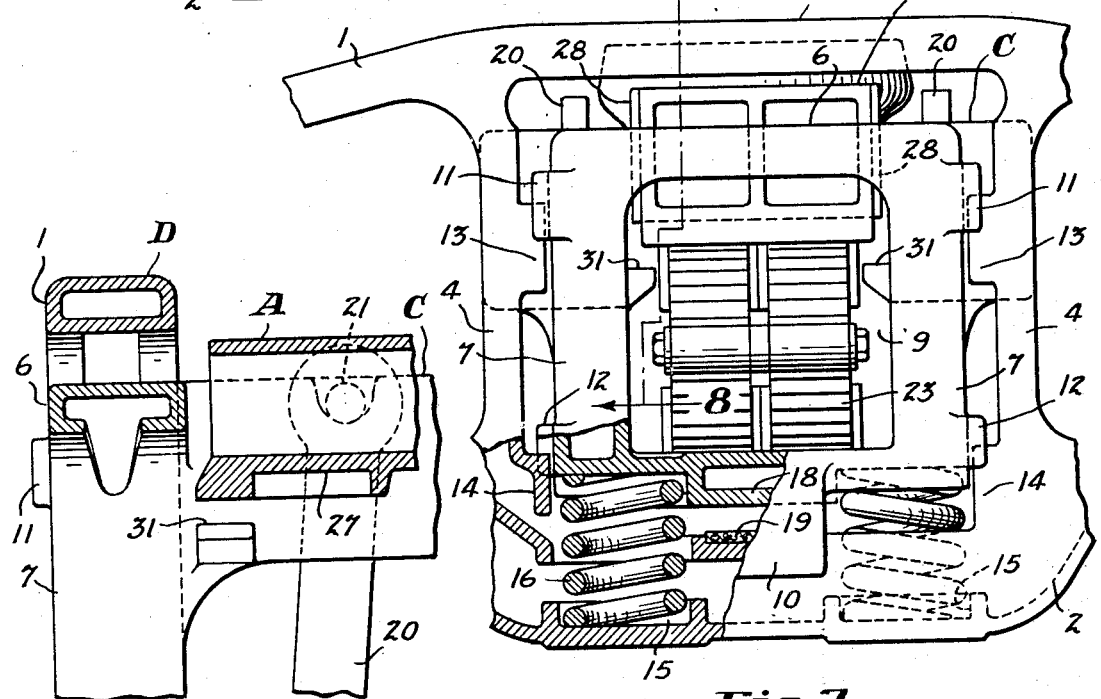
INVENTOR
Rudolph Leppla
BY Evans & McCoy
ATTORNEYS Patented Apr. 27, 1943

2,317,389

UNITED STATES PATENT OFFICE 2,317,389

CAR TRUCK

Rudolph Leppla, Davenport, Iowa, assignor, by mesne assignments, to McConway & Torley Corporation, Pittsburgh, Pa., a corporation of Pennsylvania Application March 3, 1941, Serial No. 381,428

7 Claims. (Cl. 105—190)

This invention relates to car trucks, and more particularly to trucks of the so-called "swing motion" type in which the bolster is supported upon springs carried by supporting members pivotally suspended from a transom extending across the space between the truck side frames.

In trucks for railway cars it is desirable to so support the car body that oscillations or vibrations in the car body are reduced as much as possible, and with this end in view various bolster cushioning spring arrangements have been devised. In cars such as freight cars, where there is great variation in the weight of the load imposed upon the trucks, considerable difficulty has been experienced in providing a spring cushion which is effective throughout the range of the loads to which the springs may be subjected. Railway freight cars are usually designed to carry heavy loads and the spring supports for such cars have heretofore been designed to provide adequate cushioning under maximum load. Springs stiff enough to provide an effective cushion for the maximum load are not as effective as desirable in reducing vibrations in an empty or lightly loaded car.

The truck of the present invention is designed to provide a spring cushion for the bolster which has a high rate of deflection under pressures such as are normally imposed thereon when the car is empty or lightly loaded, but in which the deflection characteristics are automatically changed to provide a lower rate of deflection than a stiffer cushion for pressures which are materially in excess of the pressure exerted upon the spring cushion by the weight of a car loaded to capacity so that a lightly loaded car is supported upon a soft cushion and whereby severe impact shocks and heavy carloads are resisted by a relatively stiff cushion. This differential cushioning action provides a car which is easy riding when empty or fully loaded and at high speeds or at low speeds of travel. The differential cushioning action referred to is claimed in my copending application, Serial No. 382,955, filed March 12, 1941.

An object of the invention is to provide a car truck of the cushioned transom type, which is so constructed that the side frames and wheels of the truck may be removed without disturbing the bolster and transom assembly or the transom supporting springs.

A further object of the invention is to provide a truck of the cushioned transom type in which the transom is guided for vertical movements in the side frames by means of upper and lower guides, which are widely spaced, so that they hold the side frames against lateral tilting with respect to the transom with little frictional resistance to vertical movements of the transom in the side frames.

With the above and other objects in view, the invention may be said to comprise the car truck as illustrated in the accompanying drawings, hereinafter described and particularly set forth in the appended claims, together with such variations and modifications thereof as will be apparent to those skilled in the art to which the invention pertains.

Reference should be had to the accompanying drawings forming a part of this specification, in which:

Figure 1 is a side elevation of a truck embodying the invention, a portion of the end of a transom and the adjacent guide column of the side frame being shown in vertical section;

Fig. 2 is a section taken on the line indicated at 2—2 in Fig. 1;

Fig. 3 is a fragmentary top plan view of the truck, one side member of the transom and the adjacent guide column of the side frame being shown in horizontal section;

Fig. 4 is a section taken on the line indicated at 4—4 in Fig. 1;

Fig. 5 is a fragmentary side elevation showing the transom lifted to the position which permits removal of the side frame;

Fig. 6 is a sectional view similar to Fig. 4 showing a stop for limiting the compression of the bolster spring;

Fig. 7 is a fragmentary side elevation of the truck showing another form of stop for the bolster spring; and Fig. 8 is a section on the line indicated at 8—8 in Fig. 7.

Since the side frames of the truck and the supports for opposite ends of the transom, spring plank and bolster are identical, the accompanying drawings show the construction at one side of the truck only, it being understood that this construction is duplicated at the opposite side of the truck, as is the usual practice in car truck construction.

Referring to the accompanying drawings, the truck of the present invention has a bolster A upon which the car body is supported, a spring plank B which carries the cushioning springs upon which the ends of the bolster A rest, a transom C from which the spring plank is pivotally suspended, and side frames D in which the ends of the transom C are slidably mounted.

Each side frame D has an upper compression chord 1 and a lower tension chord 2, which connect journal boxes 3, located at opposite ends of the frame, and has spaced, vertical guide columns 4 which connect the chords 1 and 2 intermediate their ends.

The transom C comprises spaced crossbeams 5 which extend across the space between the side frames D of the truck, the crossbeams 5 being rigidly connected at each end by a cross member 6 which forms the upper bar of a rectangular guide portion at the end of the transom which is mounted in the space between the guide columns 4 of the side frame, the vertically disposed rectangular end portions of the transom having vertical side bars 7, and a bottom member 8 connecting the lower ends of the side bars 7, the bars 6, 7 and 8 providing a central, substantially rectangular window 9 in the guide portion of the transom. The transom with its end portions may be a one-piece casting. The top and bottom chords of the side frame, together with the vertical guide columns 4, provide a centrally located, rectangular opening in the side frame, in which the rectangular end portion of the transom is slidably received.

The bottom member 8 of the transom is provided with a pair of depending guide flanges 10 centrally thereof, which are adapted to receive between them the lower chord 2 of the side frame. The side bars 7 of the transom guide portion have upper and lower pairs of flanges 11 and 12 which receive guiding projections 13 and 14 provided on the inner faces of the columns 4. The height of the opening in the side frames exceeds the height of the guide portion of the transom by an amount greater than the width of the guide flanges 11 and 12, and greater than the height of the flanges 10. The inner faces of the columns 4 above the projections 13 and 14 are offset laterally with respect to the inner faces of the projections 13 and 14 a distance greater than the height of the flanges 11 and 12, so that the transom may be lifted in the side frames to a position in which the flanges 10, 11 and 12 are clear of the bottom chord and guide columns of the side frame, so that the side frame may be moved laterally.

In the truck shown in the drawings, the car body is supported upon superposed sets of cushioning springs. The bottom chord 2 of the side frame is provided with spring pockets 15, in which are mounted coil springs 16 which bear against the underside of the bottom member 8 of the transom. The bottom chord 2 of the side frame has a central seating portion 17 between the spring pockets 15, and the central portion of the bottom member 8 of the transom has a seat 18 adapted to rest upon the seat 17. The depth of the pockets 15 is such that the load imposed upon the transom may compress the springs 16 into the pockets sufficiently to permit the seating of the transom upon the seat 17 of the bottom chord without crushing the springs. A pad 19, preferably composed of rubber and fabric, may be provided to cushion impacts between the seating portion 18 of the transom and the seat 17 of the bottom chord 2.

In freight car trucks the characteristics of springs 16 may be chosen such that the transom is supported clear of the seat 17 even when the car is carrying its maximum load. Seat 17 then functions to prevent crushing of these springs when subjected to excessive shock loads. However, if desired, seat 17 or the depth of pockets 15 may be so proportioned as to "stop off" springs 16 at any point in their range of deflection so that they function only under light loads but are "stopped off" under heavy loads.

Spring plank B is suspended from the transom C by means of links 20, which are connected at their upper ends by pivots 21 to the transom C and at their lower ends by pivots 22 to the spring plank B. A suitable spring support for the bolster is carried by the spring plank. As herein shown, an elliptic spring 23 (but which may also be a coil or combination coil and elliptic), is supported upon the end of the spring plank B and in turn supports the end of the bolster A. The lower leaf of the spring 23 has a central band 24, which is received in a socket 25 in the end of the spring plank; the upper leaf of the spring 23 has a central band 26, which is received in the socket 27 on the underside of the bolster A. A suitable spring cap 29 and shim may be used if desired. The outer end of the spring 23 may project through the window 9 in the end portion of the transom. The bolster A may be positioned between the spaced cross beams 5 of the transom and guided for vertical movement between these members. In order to reduce wear, hardened steel wear plates 28 may be attached to opposite sides of the bolster A for sliding engagement with the opposed faces of the crossbeam 5.

While my invention has been described in connection with a construction in which the transom cushioning springs only are "stopped off," it is to be understood that the invention contemplates the "stopping off" either of the transom springs 16 or the bolster springs 23. Suitable stops for limiting the deflection of the springs 23 are shown in Figs. 6, 7, and 8 of the drawings. In Fig. 6, the bolster spring 23 is provided with bumper pads 30 on the central bands thereof which are engaged upon collapsing movement of the spring to limit the deflection of the spring. In Figs. 7 and 8 of the drawings, lugs 31 are shown upon the crossbeams 5 which underlie the bolster and limit its downward movement to prevent deflection of the springs 23 beyond a predetermined point. When stops such as 30 or 31 are employed, the springs 23 may be the relatively weak auxiliary springs which are "stopped off" and the springs 16 may be relatively stiff springs which cushion the load after the springs 16 are "stopped off." Where stops are provided for both the bolster and transom springs as shown in Figs. 6, 7 and 8, the stop for the weaker spring puts that spring out of action wherever a predetermined load less than the maximum is imposed thereon, and the stop for the stronger spring serves as a safety stop to prevent breaking or crushing of the spring by an excessive impact.

The connection between the transom and side frames provided by the present invention prevents tilting or other angular movement of the side frames relative to the transom, so that axles and transom are maintained in parallel relation and twisting stresses on the axle bearings are prevented. Upper and lower bolster guides are provided which are spaced apart a considerable distance, so that forces tending to tilt the side frames do not create an excessive resistance to vertical sliding movements of the transoms in the side frames. The guide flanges 10 and 12 adjacent the bottom of the transom end members are spaced a considerable distance below the upper guide flanges 11, which are adjacent the top of the transom, so that a minimum of angular movement is permitted and an effective leverage is provided to resist the laterally exerted forces tending to tilt the frames, without creation of excessive pressure and sliding friction between the guide members.

By providing side frame openings which have a height sufficient to permit the transom to be lifted off the springs 16 and to position the flanges 10 above the seat 17, and the flanges 11 and 12 above the projections 13 and 14, the side frames are easily removable. To remove a side frame it is necessary only to jack up the transom and support it in the position shown in Fig. 5, whereupon the side frame can be readily removed. This may be done with the car body in place upon the bolster.

If the springs 16 are chosen to be of greater yieldability, i. e., have more deflection per unit load, than springs 23 but of sufficient capacity to support the transom above seat 17 when the car is loaded, the weight of the car body and load is transmitted to the side frames through both the springs 23 and 16, thereby providing a spring cushion which has a flexibility greater than would be provided by either set of springs acting alone. Under these conditions the transom cushioning springs do most of the cushioning, and the bolster cushioning springs 23 have a snubbing effect when the load is transferred to them by seating of the transom on the side frame upon excessive impacts. Friction and inertia effects of the transom moving in relation to the side frames serve to help dampen vibrations. The difference in the period of vibration of the two sets of springs also helps prevent periodic vibration, and the car body is thus effectively cushioned.

It is to be understood that there may be considerable variations in both the range of cushioning action of the springs and in the yieldability of these springs, depending upon the character of service required of the car supported by the springs. Where there is a wide variation in weight between the loaded and empty car, as in the case of heavy-duty freight cars, it is contemplated that the yieldability of the transom cushioning springs will be considerably greater than the yieldability of the bolster cushioning springs, in order to effectively cushion the empty car. However, for cars which carry only relatively light loads, it may be desirable to provide springs 16 stiff enough to work under the normal full load, in which case the transom seats upon the side frame only when the springs are subjected to excessive pressure due to impacts. The choice of springs is also partially determined by the range of movement required and room available for springs in the truck.

The bolster and transom cushioning springs may be readily replaced with springs of greater or less capacity having the timing or range of movement desired. For example, when it is desired to use a car designed for heavy loads for carrying lighter loads, the transom cushioning springs or both the transom and bolster cushioning springs may be replaced with springs having the characteristics desirable for the lighter loads.

The truck of the present invention may be advantageously used on relatively light cars, such as cabooses, in which case the easy riding characteristics are obtained due to the greater range of deflection and also to the dampening or breaking of the harmonic action of the springs due to the difference in the frequency or timing of the bolster and transom cushioning springs.

In addition to cushioning the load against road shocks the transom cushioning springs 16 perform the important function of keeping the transom level, which in turn prevents tipping or rocking of the bolster. In a road shock, such as a low rail joint, the leading wheel of the truck is first lowered. This permits the forward transom cushioning springs to open up slightly, tending to keep the transom level. When the leading wheels come up again and the trailing wheels drop, the rearward transom springs can open to maintain the transom level. The same effect is accomplished when the car passes over poorly levelled portions of the track.

My invention provides riding characteristics never before found in swing motion trucks, or in any other type of truck designed to allow lateral motion of the bolster. While my invention has been described in connection with a truck in which there is provision for lateral motion, I do not wish to limit my invention to such applications since it is applicable to trucks in which there is no provision for lateral bolster motion, and it is to be understood that other variations and modifications of the specific devices, herein shown and described for purposes of illustration, may be made without departing from the spirit of the invention.

What I claim is:

1. In a car truck, side frames each having top and bottom chords and spaced vertical columns connecting said chords and forming therewith a substantially rectangular opening, said bottom chord having spring receiving recesses, a transom having end portions positioned between said columns and overlying said recesses, said end portions being substantially rectangular in form and having side members disposed parallel to said columns and a bottom member engageable with said bottom chord, guide members carried by said transom ends, certain of said guide members straddling said columns at spaced points and other of said guide members straddling said bottom chord, cushioning springs mounted in the recesses of the bottom chords and interposed between said end portions of the transom and the bottom chords of the side frames, said springs being compressible into said recesses to permit the transom to seat upon the bottom chord when a predetermined weight substantially greater than that of the car body is imposed thereon, and a bolster yieldably supported upon said transom.

2. In a car truck, the combination with the side frames, having central openings and vertical guide members at the sides thereof, of a transom having its ends disposed in said openings, said side frames having spring receiving pockets underlying the openings thereof, springs in said pockets to support the ends of the transom, said transom having flanges which overlie the vertical guide members and flanges which straddle portions of the side frame beneath the opening thereof to prevent movement of the side frame longitudinally of the transom.

3. In a car truck, the combination with side frames each having top and bottom chords and spaced vertical columns connecting the chords, of a transom connecting the side frames and having end portions guided for vertical movement between the columns of the side frames, said end portions having lateral flanges engaging said columns and depending flanges which straddle the bottom chord to prevent movement of the side frames longitudinally of the transom when the transom is in normal position, said columns having recessed portions which align with said lateral flanges on the transom when the latter is elevated above its normal position in the openings of the side frame to a position in which said depending flanges clear the bottom chord to permit the side frame to be moved outwardly without interference from said column flanges.

4. In a car truck, the combination with side frames each having top and bottom chords and spaced vertical columns connecting the chords, of a transom connecting the side frames and having end portions guided for vertical movement between the columns of the side frames, said end portions having lateral flanges engaging said columns and depending flanges which straddle the bottom chord to prevent movement of the side frames longitudinally of the transom when the transom is in normal position, said columns having recessed portions which align with said lateral flanges on the transom when the latter is elevated above its normal position in the openings of the side frame to a position in which said depending flanges clear the bottom chord to permit the side frame to be moved outwardly without interference from said column engaging flanges, and cushioning springs interposed between said transom and said side frames.

5. In a car truck, the combination with side frames each having top and bottom chords and spaced vertical columns connecting the chords, of a transom connecting the side frames and having end portions guided for vertical movement between the columns of the side frames, said end portions having flanges engaging said columns to prevent movement of the side frames longitudinally of the transom when the transom is in normal position, said columns having recessed portions which align with flanges on the transom when the latter is elevated above its normal position in the openings of the side frame and permit the side frame to be moved outwardly without interference from said column flanges, cushioning springs interposed between said transom and said side frames, a bolster yieldably supported upon said transom, and means for limiting the downward movement of the transom in the side frames to prevent the imposition of a load greater than a predetermined amount upon said transom cushioning springs.

6. In a swing motion car truck, the combination with side frames each having top and bottom chords and spaced vertical columns connecting the chords, of a transom connecting the side frames and having end portions guided for vertical movement between the columns of the side frames, said end portions having flanges engaging said columns to prevent movement of the side frames longitudinally of the transom when the transom is in normal position, said columns having recessed portions which align with flanges on the transom when the latter is elevated above its normal position in the openings of the side frame and permit the side frame to be moved outwardly without interference from said column flanges, cushioning springs interposed between said transom and said side frames, suspension links pivoted to said transom, spring seats carried by said links, springs mounted on said seats, a bolster supported upon the latter springs, and means for limiting the downward movement of the transom in the side frames to limit the load imposed upon said transom cushioning springs.

7. In a car truck, side frames, each having top and bottom chords and spaced vertical columns connecting the chords to provide a substantially rectangular opening, each column having a guide portion adjacent the lower end thereof, a second guide portion spaced vertically from the first and recessed portions between the two guide portions and between the upper guide portion and the top chord, a transom having substantially rectangular end portions disposed in said side frame openings, said end portions of the transom having guide flanges engageable with the lower guide portions of the columns and flanges engageable with the upper guide portions of the columns to prevent relative lateral movements of the side frames with respect to the transom, said end portions also having bottom flanges overlying opposite sides of the bottom chords of the side frames, the end portions of the transom being movable upwardly in said side frames a sufficient distance to free said guide flanges from the guide portions of the columns and from the bottom chord to permit removal of the side frames.

RUDOLPH LEPPLA.